US00RE46416E

(19) United States
(12) Reissued Patent
Kim

(10) Patent Number: US RE46,416 E
(45) Date of Reissued Patent: May 30, 2017

(54) MOBILE PHONE MONITOR

(71) Applicant: Samsung Electronics Co., Ltd., Suwon-si (KR)

(72) Inventor: Dong-Kyun Kim, Seoul (KR)

(73) Assignee: Samsung Electronics Co., Ltd., Suwon-si (KR)

(21) Appl. No.: 29/546,443

(22) Filed: Nov. 23, 2015

Related U.S. Patent Documents

Reissue of:

(64) Patent No.: Des. 671,940
Issued: Dec. 4, 2012
Appl. No.: 29/406,260
Filed: Nov. 11, 2011

U.S. Applications:

(62) Division of application No. 29/487,578, filed on Apr. 10, 2014, which is an application for the reissue of Pat. No. Des. 671,940.

(30) Foreign Application Priority Data

Jul. 29, 2011 (KR) ..... 30-2011-0031692

(51) LOC (10) Cl. ..... 14-02

(52) U.S. Cl.
USPC ..... D14/374; D14/130

(58) Field of Classification Search
USPC ..... D14/371–376, 125–130, 336, 337, 341, D14/217, 142, 239, 240, 434, 238.1; (Continued)

(56) References Cited

U.S. PATENT DOCUMENTS

D490,420 S * 5/2004 Solomon et al. ..... D14/341
D504,889 S * 5/2005 Andre et al. ..... D14/341
(Continued)

*Primary Examiner* — Darlington Ly
(74) *Attorney, Agent, or Firm* — NSIP Law

(57) CLAIM

[The] *I claim the* ornamental design for a mobile phone monitor, as shown and described.

DESCRIPTION

*Notice: more than one reissue application has been filed for the reissue of U.S. Pat. No. D671,940. This reissue design patent application is a divisional reissue application of Reissue application Ser. No. 29/487,578, which was filed on Apr. 10, 2014, which is a reissue of U.S. Design Pat. No. D671,940, issued Dec. 4, 2012, which claims the benefit under 35 U.S.C. Sections 119 and 172 of Korean Patent Application Serial No. 30-2011-0031692, filed Jul. 29, 2011, which is hereby incorporated by reference in its entirety into this application.*

FIG. 1 is a *front* perspective view of a mobile phone monitor *showing my new design*;

FIG. 2 is a front view [of the mobile phone monitor of FIG. 1] *thereof*;

FIG. 3 is a rear view [of the mobile phone monitor of FIG. 1] *thereof*;

FIG. 4 is a left-side view [of the mobile phone monitor of FIG. 1] *thereof*;

FIG. 5 is a right-side view [of the mobile phone monitor of FIG. 1] *thereof*;

FIG. 6 is a top [plan] view [of the mobile phone monitor of FIG. 1] *thereof*;

FIG. 7 is a bottom [plan] view [of the mobile phone monitor of FIG. 1] *thereof*; and, FIG. 8 is a rear perspective view of the mobile phone monitor of FIG. 1, in which a mobile phone [shown] in broken lines [for environmental purposes only and forms no part of the claimed design illustrates] *is provided to illustrate* an example of how the mobile phone may be [docketed in] *docked to* the mobile phone monitor of FIG. 1.

*The broken lines in the figures show portions of the mobile phone monitor which form no part of the claimed design. The broken line showing of the mobile phone in FIG. 8 is for environmental purposes only and forms no part of the claimed design.*

1 Claim, 6 Drawing Sheets

Matter enclosed in heavy brackets [ ] appears in the original patent but forms no part of this reissue; matter printed in italics indicates the additions made by reissue.

AMENDED

(58) Field of Classification Search
USPC ..... D6/308, 311; 361/679.08, 679.23; 349/1, 2, 11, 58; 345/104, 156, 173, 174; 341/12; 248/917–924, 371
CPC ..... F16M 11/08; F16M 11/22; F16M 2200/08
See application file for complete search history.

(56) References Cited

U.S. PATENT DOCUMENTS

| | | | | | |
|---|---|---|---|---|---|
| D617,793 | S | * | 6/2010 | Chiang et al. | D14/341 |
| D629,373 | S | * | 12/2010 | Kim et al. | D14/126 |
| D639,266 | S | * | 6/2011 | DeLorenzo et al. | D14/142 |
| D644,228 | S | * | 8/2011 | Corsini et al. | D14/434 |
| D669,070 | S | * | 10/2012 | Hsu | D14/341 |
| D671,939 | S | * | 12/2012 | Chung | D14/130 |
| D677,181 | S | * | 3/2013 | Lenz | D10/65 |
| 8,605,433 | B2 | * | 12/2013 | Chiang | F16M 11/10 361/679.59 |
| 8,606,340 | B2 | * | 12/2013 | Pegg | H04M 1/0247 455/575.4 |
| D701,570 | S | * | 3/2014 | Fletcher | D19/113 |
| D701,862 | S | * | 4/2014 | Lee | D14/420 |
| D702,231 | S | * | 4/2014 | Park | D14/341 |
| D704,200 | S | * | 5/2014 | Rayner | D14/447 |
| D722,049 | S | * | 2/2015 | Moradian | D14/341 |
| 2003/0236102 | A1 | * | 12/2003 | Kawai et al. | 455/550.1 |
| 2006/0236014 | A1 | | 10/2006 | Yin et al. | |
| 2010/0309617 | A1 | | 12/2010 | Wang et al. | |

* cited by examiner

AMENDED
FIG. 1
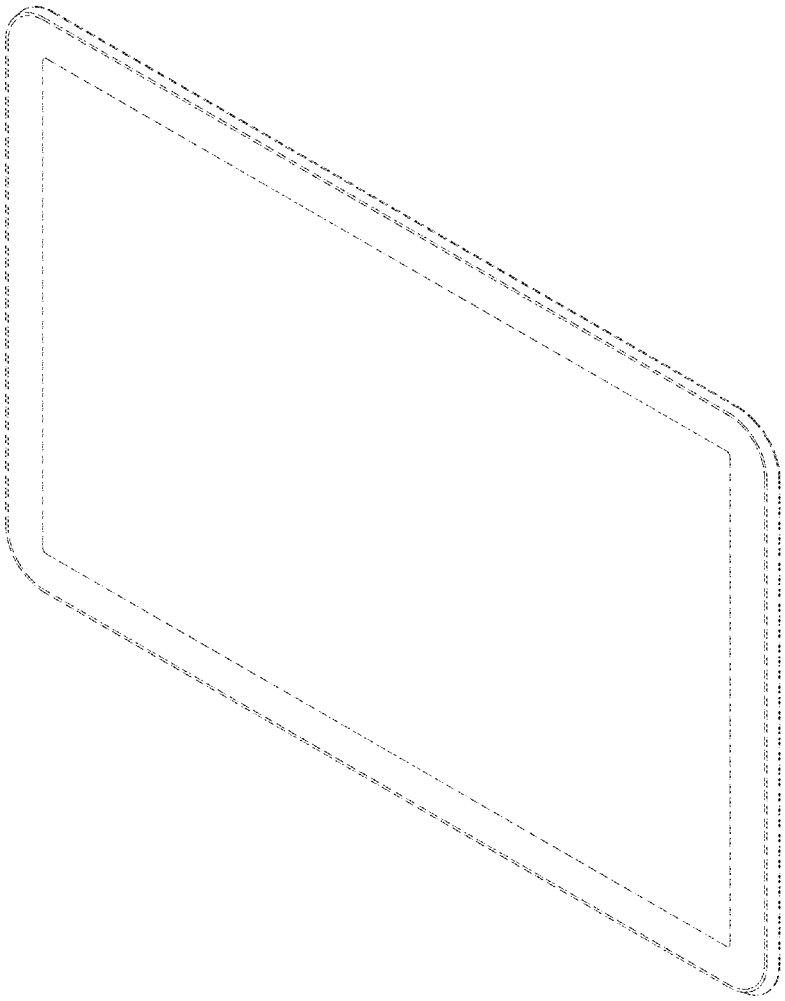

AMENDED
FIG. 2
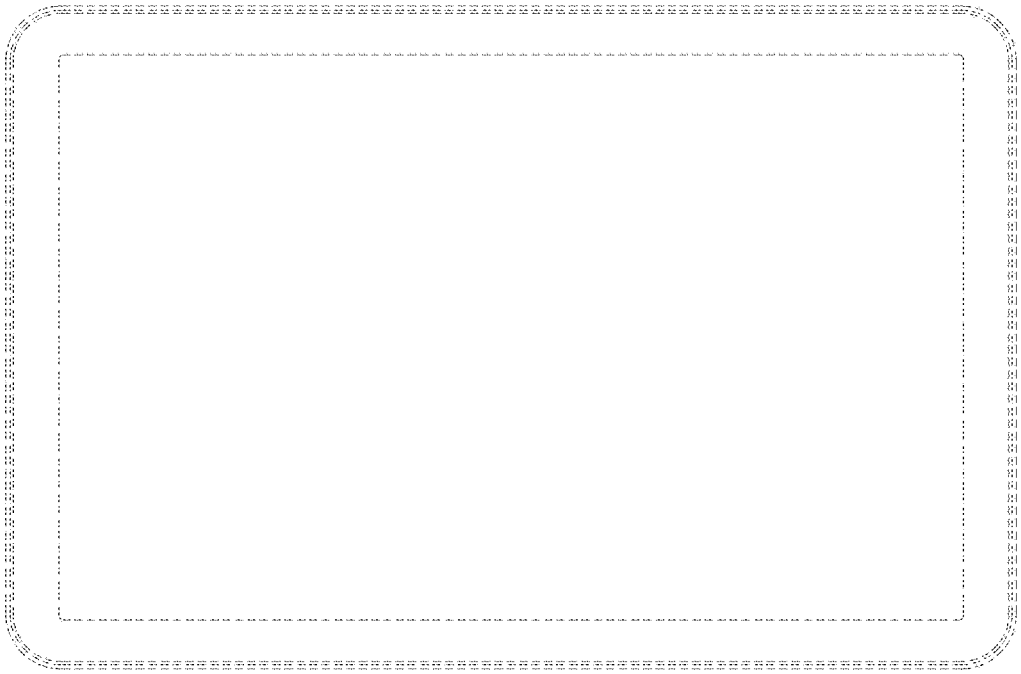

AMENDED
FIG. 3
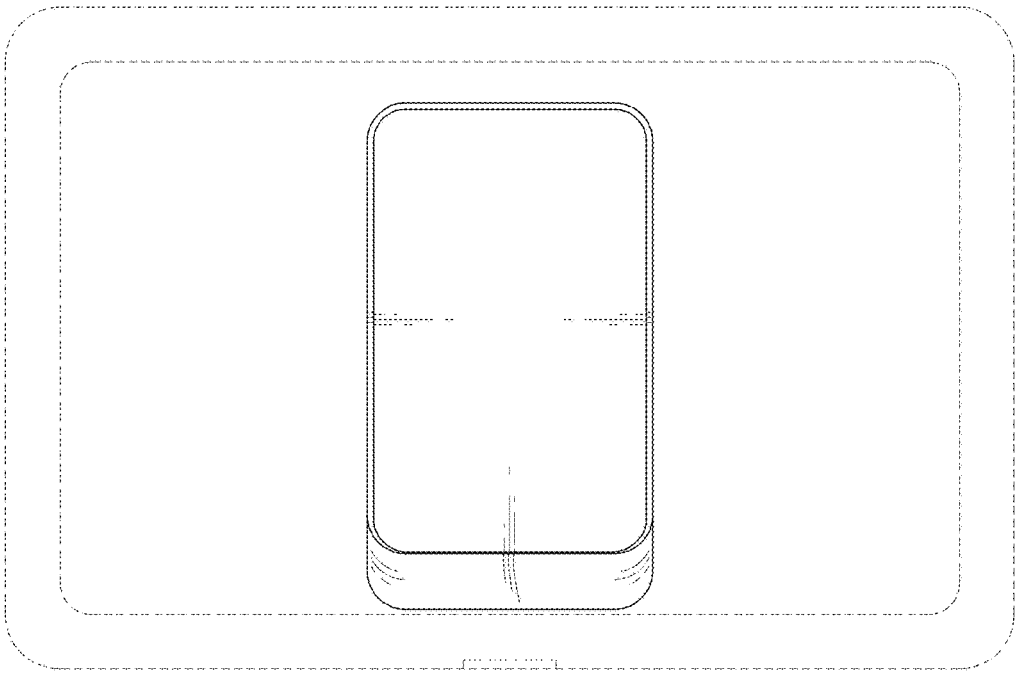

AMENDED
FIG. 4
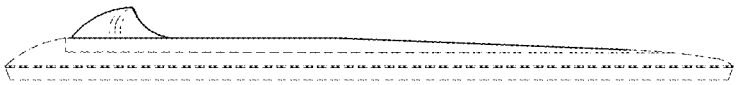
AMENDED
FIG. 5
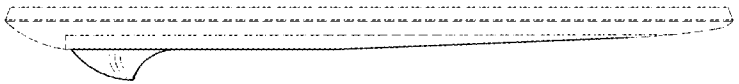

AMENDED
FIG. 6
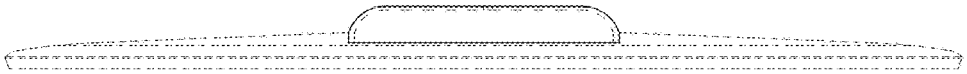
AMENDED
FIG. 7
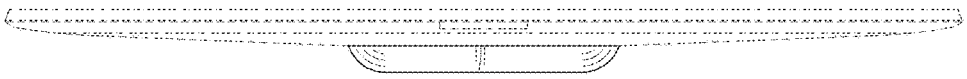

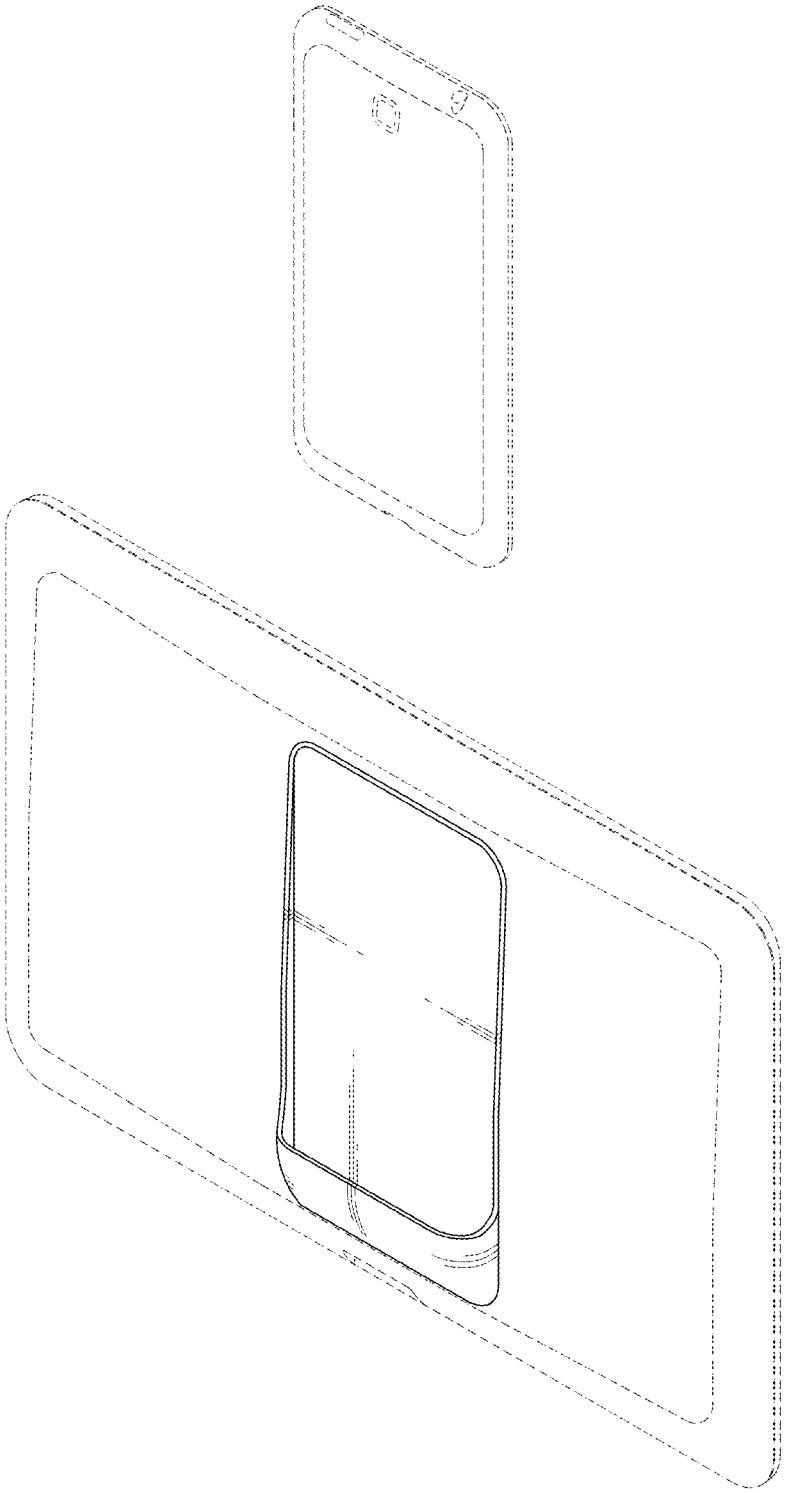

AMENDED
FIG. 8